(12) United States Patent
Kagitani et al.

(10) Patent No.: US 7,017,367 B2
(45) Date of Patent: Mar. 28, 2006

(54) METHOD OF CONTROLLING PROGRESSIVE FREEZE-CONCENTRATION

(75) Inventors: Kazuo Kagitani, Nasu-gun (JP); Kiro Hayakawa, Nasu-Gun (JP)

(73) Assignee: Kagome Kabushiki Kaisha, Nagoya (JP)

( * ) Notice: Subject to any disclaimer, the term of this patent is extended or adjusted under 35 U.S.C. 154(b) by 0 days.

(21) Appl. No.: 10/917,162

(22) Filed: Aug. 11, 2004

(65) Prior Publication Data

US 2005/0050917 A1   Mar. 10, 2005

(30) Foreign Application Priority Data

Sep. 8, 2003 (JP) .............................. 2003-314975

(51) Int. Cl.
*B01D 9/04* (2006.01)
(52) U.S. Cl. .......................................... 62/540; 62/123
(58) Field of Classification Search .......... 62/532–545, 62/123–124
See application file for complete search history.

(56) References Cited

U.S. PATENT DOCUMENTS

| | | | | |
|---|---|---|---|---|
| 3,328,972 A | * | 7/1967 | Svanoe .................. | 62/123 |
| 3,347,058 A | * | 10/1967 | Svanoe .................. | 62/541 |
| 4,291,550 A | * | 9/1981 | Engdahl et al. .......... | 62/544 |
| 4,551,159 A | * | 11/1985 | Goldstein ............... | 62/541 |
| 5,035,733 A | * | 7/1991 | Goldstein ............... | 62/541 |
| 5,139,549 A | * | 8/1992 | Knodel et al. ........... | 62/532 |
| 5,575,160 A | * | 11/1996 | Keus .................... | 62/544 |
| 6,378,329 B1 | * | 4/2002 | Paul ..................... | 62/544 |
| 6,658,889 B1 | * | 12/2003 | Krylov .................. | 62/544 |

\* cited by examiner

*Primary Examiner*—William E. Tapolcai
(74) *Attorney, Agent, or Firm*—Beyer Weaver & Thomas LLP

(57) ABSTRACT

In a method of controlling progressive freeze-concentration by circulating a cooling medium through a cooling-medium flow route while circulating a target liquid for freeze-concentration through a target-liquid flow route so as to gradually form ice crystals on wall surfaces of the target-liquid flow route, a volume expansion detecting device is used to detect volume expansion of the target liquid and thickness of the ice crystals in the target-liquid flow route is obtained from the volume expansion detected by this volume expansion detecting device. The flow rate of the target liquid and the growth speed of the ice front in the target-liquid flow route are controlled to become equal respectively to a set flow rate value and to a set growth speed value by carrying out operations of specified kinds based on the crystal thickness thus obtained such as calculating inner diameter of the ice crystals, calculating a required flow volume of the target liquid in the target-liquid flow route from the calculated inner diameter and the set flow rate, and adjusting circulation volume of the target liquid such that measured flow volume of the target liquid becomes equal to the required flow volume, and calculating actual growth speed of the ice front from the obtained crystal thickness and adjusting temperature and/or circulation volume of the cooling medium such that the calculated actual growth speed becomes equal to the set growth speed value.

17 Claims, 2 Drawing Sheets

METHOD OF CONTROLLING PROGRESSIVE FREEZE-CONCENTRATION

Priority is claimed on Japanese Patent Application 2003-314975 filed Sep. 8, 2003.

BACKGROUND OF THE INVENTION

This invention relates to a method of controlling progressive freeze-concentration. The so-called freeze-concentration method is coming to be noted for concentrating target liquids of foods and medicaments for obtaining concentrates of a superior quality. Although both the suspension crystallization method and the progressive freeze-concentration method are known as examples of the freeze-concentration method, the present invention relates to the progressive freeze-concentration method and in particular to a control method for the progressive freeze-concentration of a target liquid while a target liquid and a cooling medium are being circulated.

As disclosed, for example, in Shokuhin-To-Gijutsu ("Foods and Technologies"), Vol. 318, pp. 1–8 (December, 1997) and the Proceedings of Japan Society of Food Engineering ((2000), page 85), it has been known as a method of progressive freeze-concentration to freeze-concentrate a target liquid by causing a cooling medium to circulate through a cooling-medium flow route of a freeze-concentration apparatus while causing the target liquid to circulate through a target-liquid flow route of this apparatus so as to gradually form ice crystals on wall surfaces of the target-liquid flow route.

In such a method of progressive freeze-concentration, the flow rate of the target liquid and the growth speed of the ice front at the ice-liquid interface during the freeze-concentration are two important factors that significantly influence the effective freeze-concentration of the target liquid. If the flow rate of the target liquid at the ice-liquid interface is too slow, the content ratio of solute to the ice crystals becomes accordingly too high. If it is too fast, on the other hand, the load on the freeze-concentration apparatus becomes accordingly large. If the growth sneed of the ice crystal is too fast, the content ratio of solute to the ice crystal becomes accordingly too high. If it is too slow, on the other hand, the time of freeze-concentration becomes accordingly too long. In such a progressive freeze-concentration method as described above, it is important to adjust both the flow rate of the target liquid and the growth speed of the ice front at the ice-liquid interface during the freeze-concentration, but there has not been any method proposed for controlling these factors. Ordinarily, either the rotary speed of the pump for circulating the target liquid and the temperature of the cooling medium are kept at fixed levels, or the flow rate of the target liquid and the growth speed of ice front at the ice-liquid interface during the freeze-concentration are estimated and the rotary speed of the pump for circulating the target liquid is gradually lowered or the temperature of the cooling medium is lowered as the time for freeze-concentration elapses. With such prior art methods, however, it is not possible to optimize the flow rate of the target liquid or the growth speed of the ice front at the ice-liquid interface during the freeze-concentration, allowing these factors to undergo significant changes.

SUMMARY OF THE INVENTION

It is therefore an object of this invention to provide a method of controlling the aforementioned two factors (that is, the flow rate of the target liquid and the growth speed of the ice front at the ice-liquid interface during freeze-concentration when a progressive freeze-concentration apparatus is used to circulate a cooling medium through its cooling-medium flow route while circulating the target liquid through its target-liquid flow route for freeze-concentration of the target liquid by gradually forming ice crystals on the wall surface of this target-liquid flow route) to predetermined optimum values.

A method of this invention for controlling progressive freeze-concentration may be characterized as comprising the steps of circulating a cooling medium through a cooling-medium flow route of a freeze-concentration apparatus while circulating a target liquid for freeze-concentration through a target-liquid flow route of this freeze-concentration apparatus, thereby gradually forming ice crystals on wall surfaces of the target-liquid flow route in freeze-concentration of the target liquid, connecting to this target-liquid flow route a volume expansion detecting means for detecting volume expansion of the target liquid, obtaining thickness of the ice crystals in the target-liquid flow route from volume expansion detected by the volume expansion detecting means, and controlling flow rate of the target liquid and growth speed of the ice front in the target-liquid flow route to become respectively a set flow rate value and a set growth speed value by carrying out Operation A and Operation B to be described below, based on the obtained thickness. In the above, Operation A is an operation comprising the steps of calculating inner diameter of the ice crystals in the target-liquid flow route from the obtained thickness, calculating a required flow volume of the target liquid in the target-liquid flow route from the calculated inner diameter and the set flow rate, and adjusting circulation volume of the target liquid such that measured flow volume of the target liquid inside the target-liquid flow route becomes equal to the required flow volume, and Operation B is an operation comprising the steps of calculating actual growth speed of the ice front in the target-liquid flow route from the obtained thickness and adjusting temperature and/or circulation volume of the cooling medium such that the calculated actual growth speed becomes equal to the set growth speed value. In summary, the method of this invention is of the prior art type of circulating a cooling medium through a cooling-medium flow route of a freeze-concentration apparatus while circulating a target liquid for freeze-concentration through a target-liquid flow route of this freeze-concentration apparatus, thereby gradually forming ice crystals on wall surfaces of the target-liquid flow route but is distinguishable in that the flow rate of the target liquid and the growth speed of the ice front in the target-liquid flow route are adjusted so as to assume optimum values set therefor.

The freeze-concentration apparatus to be used may comprise one or more cylindrical double tubes. If a plurality of such double tubes are provided, they may be arranged in different ways with the tubes connected in series or in parallel but arrangements with double tubes each having a target-liquid flow route formed inside and a cooling-medium flow route formed outside are preferred. Those having two or more of such cylindrical double tubes and having the target-liquid flow routes so as to together form a single circulating flow route are even more preferable.

According to this invention, a volume expansion detecting means for the target liquid is connected to the target-liquid flow route of the freeze-concentration apparatus and the thickness of the ice crystals in the target-liquid flow route is obtained from the volume expansion of the target liquid detected by this detecting means. As freeze-concentration of the target liquid is continued, the ice crystals grow on the wall surfaces of the target-liquid flow route and the total amount of the target liquid appears to increase by its volume expansion. Since the shape and the size of the target-liquid flow route, that is, its diameter and length, are known quantities, the thickness of the ice crystals in the target-liquid flow route can be easily calculated from the detected volume expansion of the target liquid.

Many kinds of means for detecting volume expansion may be used for the purpose of this invention, but the type adapted to receive the overflowing portion of the target liquid from the target-liquid flow route in a receptacle and to measure its quantity by pressure, weight or its liquid surface level is preferred. Also preferable is the type adapted to detect an integrated flow volume of the target liquid spilled out of the target-liquid flow route.

According to this invention, what are herein referred to as Operation A and Operation B are thereafter carried out on the basis of the thickness of the ice crystals in the target-liquid flow route thus obtained such that the flow rate of the target liquid and growth speed of the ice front in the target-liquid flow route will become respectively equal to a set flow rate value and a set growth speed value. In Operation A, the inner diameter of the ice crystals in the target-liquid flow route is calculated from the thickness of the ice crystals, a required flow volume of the target liquid in the target-liquid flow route is calculated from the inner diameter thus calculated and the set flow rate, and the circulation volume of the target liquid is adjusted such that the measured flow volume of the target liquid inside the target-liquid flow route becomes equal to the required flow volume. In Operation B, the actual growth speed of the ice front in the target-liquid flow route is calculated from the thickness of the ice crystals and the temperature and/or the circulation volume of the cooling medium is adjusted such that the calculated actual growth speed becomes equal to the set growth speed value.

Any known method may be used for adjusting the circulation of the target liquid in Operation A but it is preferable to do so by controlling the rotary motion of a target-liquid circulating pump by a frequency control. Any known method may be used also for adjusting the temperature of the cooling medium in Operation B but it is preferable to do so by controlling a cooler which is adapted to cool the cooling medium and it is even more preferable to do so by controlling flow volume of a portion of the cooling medium that is supplied from a cooling-medium tank connected to a cooler to an inlet to the cooling-medium flow route and of another portion of the cooling medium that is discharged from an outlet from the cooling-medium flow route and returned to the inlet to the cooling-medium flow route without passing through the cooling-medium tank. Any known method may further be used for adjusting the circulation of the cooling medium in Operation B but it is preferable to do so by controlling rotary motion of a cooling-medium circulating pump by a frequency control.

In summary, the present invention makes it possible to control two of the most important factors in the progressive freeze-concentration by circulating both a target liquid and a cooling medium, that is, to control the flow rate of the target liquid and the growth speed of the ice front at their ice-liquid interface during the freeze-concentration process according to optimum values set therefor.

PREFERRED EMBODIMENT OF THE INVENTION

Figure 1:
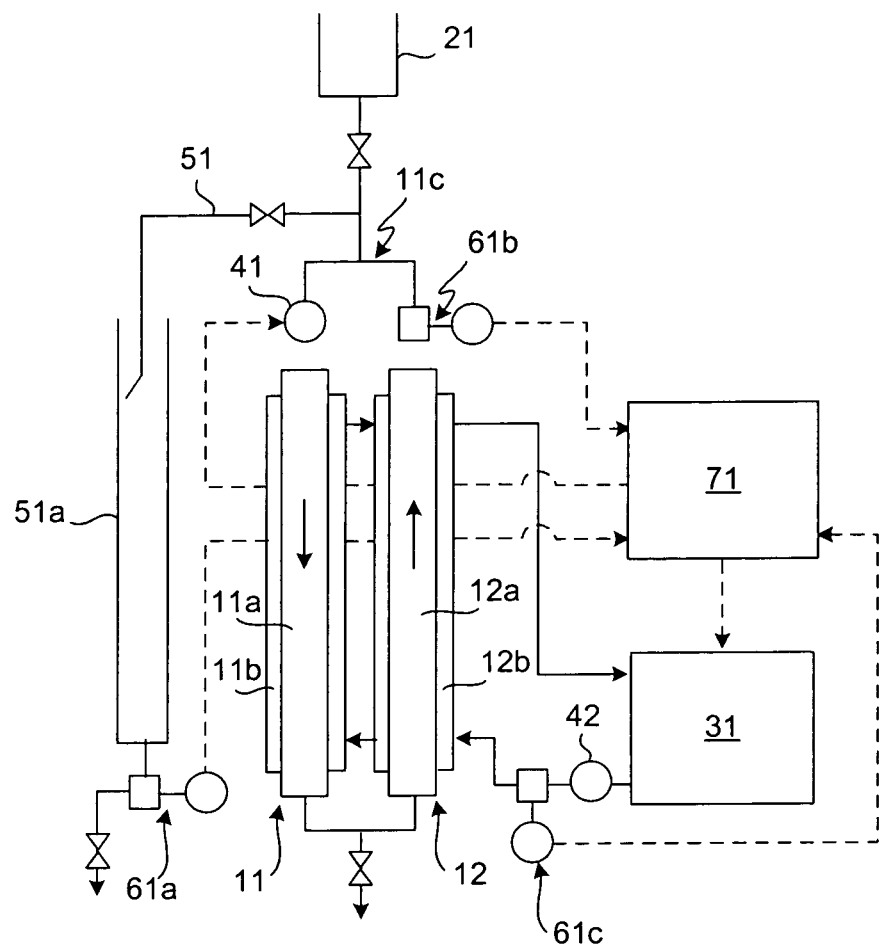
FIG. 1 is a system diagram for showing a control method of this invention.

FIG. 1 is a system diagram showing the method of control according to this invention. Two cylindrical double tubes 11 and 12 are provided, each having a target-liquid flow route 11a or 12a formed inside and a cooling-medium flow route 11b or 12b formed outside. The two target-liquid flow routes 11a and 12a are connected so as to together form a single circulating flow route 11c. A supply container 21 for the target liquid is disposed above the cylindrical double tubes 11 and 12 and is connected to the circulating flow route 11c. The two cooling-medium flow routes 11b and 12b are connected together at its upper and lower parts. An inlet and an outlet for the cooling medium are provided respectively at a lower part and an upper part of the cooling-medium flow route 12b. The inlet and the outlet are both connected to a cooler 31.

A pump 41 for circulating the target liquid is provided to the circulating flow route 11c above the target-liquid flow route 11a. A flow-out tube 51 branches out of a connecting tube which connects a point on the circulating flow route 11c further above the pump 41 and the supply container 21. The tip part of the flow-out tube 51 is received in a receptacle 51a. Another pump 42 for circulating the cooling medium is provided between the inlet of the cooling medium into the cooling-medium flow route 12b and the cooler 31.

A pressure sensor 61a is provided at the bottom of the receptacle 51a, a flowmeter 61b is inserted into the circulating flow route 11c above the target-liquid flow route 12a and a temperature sensor 61c is provided between the pump 42 and the inlet for the cooling medium into the cooling-medium flow route 12b. The pressure sensor 61a, the flowmeter 61b and the temperature sensor 61c are all connected to a calculation controller 71 which is also connected to the cooler 31 and the pump 41.

The target liquid is filled from the supply container 21 into the circulating flow route 11c including the target-liquid flow routes 11a and 12a. As the pump 41 is activated to circulate the target liquid in the counter-clockwise direction (with reference to FIG. 1) through the target-liquid flow routes 11a and 12a of the circulating flow route 11c, the cooler 31 and the pump 42 are also activated such that the cooling medium cooled by the cooler 31 is circulated through the cooling-medium flow routes 11b and 12b. Ice crystals are gradually formed and grow on the wall surfaces of the target-liquid flow routes 11a and 12a, that is, on the inner wall surfaces of the inner tubes of the cylindrical double tubes 11 and 12, such that freeze-concentration of the target liquid will progress. As the ice crystals grow, however, there is a volume expansion and the amount of the target liquid corresponding to this volume expansion will be deposited in the receptacle 51a through the flow-out tube 51.

The amount of the target liquid thus deposited in the receptacle 51a as the freeze-concentration process progresses, that is, the amount of the volume expansion of the target liquid, is sequentially detected by means of the pressure sensor 61a and the signal outputted therefrom is transmitted to the calculation controller 71. On the basis of the signals thus transmitted, the calculation controller 71 calculates the thickness of the ice crystals in the target-liquid flow routes 11a and 12a.

Set values of the flow rate and the growth speed of ice front in the target-liquid flow routes 11a and 12a are preliminarily inputted to the calculation controller 71. On the basis of the aforementioned calculated thickness of the ice crystals, the calculation controller 71 then calculates the inner diameters of the ice crystals in the target-liquid flow routes 11a and 12a and the required flow volume of the target liquid in these target-liquid flow routes 11a and 12a from these calculated inner diameters and the aforementioned set flow rate values in the target-liquid flow routes 11a and 12a and controls the rotary speed of the pump 41 by transmitting signals thereto such that the actually measured flow volume of the target liquid through the target-liquid flow routes 11a and 12a by the flowmeter 61b will become equal to the required flow volume calculated as above, thereby adjusting the quantity of the circulating target liquid. At the same time, the growth speed of the ice front in the target-liquid flow routes 11a and 12a is calculated from the aforementioned calculated thickness of the ice crystals and the operation of the cooler 31 is controlled by signals outputted from the calculation controller 71 and the temperature of the cooling medium detected by the temperature sensor 61c is adjusted such that the growth speed will come to agree with a preliminarily set value.

Figure 2:
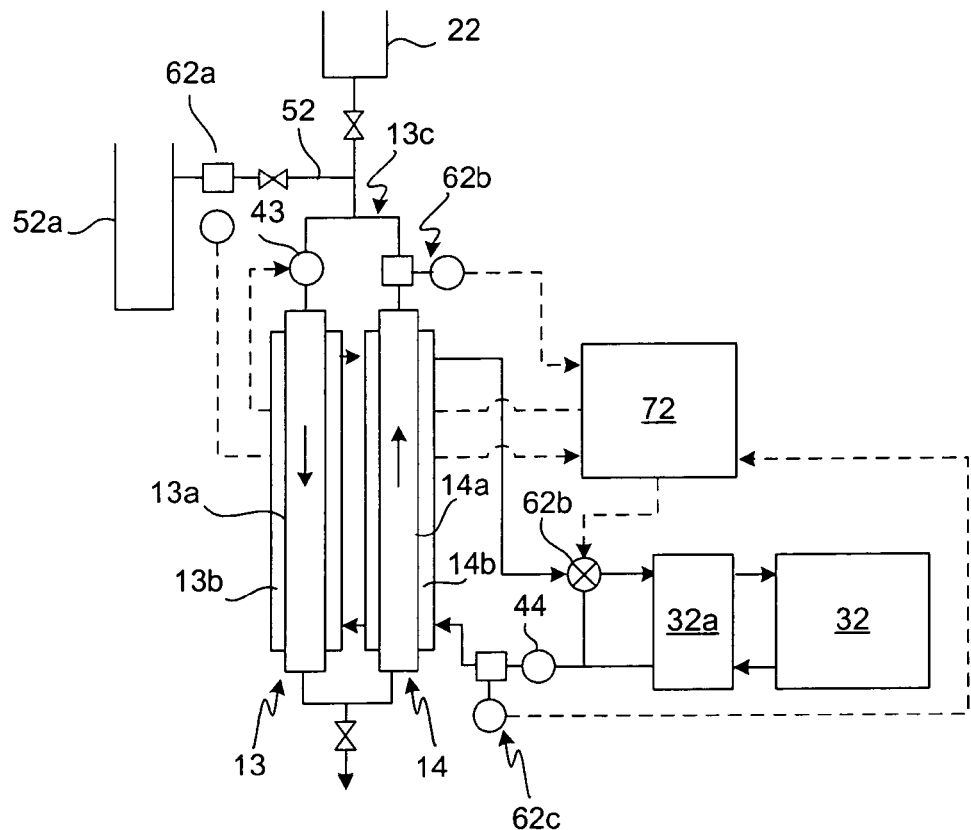
FIG. 2 is a system diagram for showing another control method of this invention.

FIG. 2 is another system diagram showing the method of control according to this invention. Two cylindrical double tubes 13 and 14 are provided, each having a target-liquid flow route 13a or 14a formed inside and a cooling-medium flow route 13b or 14b formed outside. The two target-liquid flow routes 13a and 14a are connected so as to together form a single circulating flow route 13c. A supply container 22 for the target liquid is disposed above the cylindrical double tubes 13 and 14 and is connected to the circulating flow route 13c. The two cooling-medium flow routes 13b and 14b are connected together at its upper and lower parts. An inlet and an outlet for the cooling medium are provided respectively at a lower part and an upper part of the cooling-medium flow route 14b. The inlet and the outlet are both connected to a cooling-medium tank 32a which is further connected to a cooler 32.

A pump 43 for circulating the target liquid is provided to the circulating flow route 13c above the target-liquid flow route 13a. A flow-out tube 52 branches out of a connecting tube which connects a point on the circulating flow route 13c further above the pump 43 and the supply container 22. The tip part of the flow-out tube 52 is received in a receptacle 52a. Another pump 44 for circulating the cooling medium is provided between the inlet of the cooling medium into the cooling-medium flow route 14b and the cooling- medium tank 32a.

An integrating flowmeter 62a is inserted in the flow-out tube 52, a flowmeter 62b is provided to the circulating flow route 13c above the target-liquid flow route 14a and a temperature sensor 62c in inserted between the pump 44 and the inlet for the cooling medium into the cooling-medium flow route 14b. A three-way valve 62d is provided between the outlet of the cooling medium from the cooling-medium flow route 14b and the cooling-medium tank 32a, and a bypass is passed from this three-way valve 62d to the cooling-medium tank 32a and the pump 44. The integrating flowmeter 62a, the flowmeter 62b and the temperature sensor 62c are all connected to a calculation controller 72 which is also connected to the pump 43 and the three-way valve 62d.

The target liquid is filled from the supply container 22 into the circulating flow route 13c including the target-liquid flow routes 13a and 14a. As the pump 43 is activated to circulate the target liquid in the counter-clockwise direction (with reference to FIG. 2) through the target-liquid flow routes 13a and 14a of the circulating flow route 13c, the cooler 32 and the pump 44 are also activated such that the cooling medium cooled by the cooler 32 is circulated through the cooling-medium tank 32a into the flow routes 13b and 14b. Ice crystals are gradually formed and grow on the wall surfaces of the target-liquid flow routes 13a and 14a, that is, on the inner wall surfaces of the inner tubes of the cylindrical double tubes 13 and 14, such that freeze-concentration of the target liquid will progress. As the ice crystals grow, however, there is a volume expansion and the amount of the target liquid corresponding to this volume expansion will be deposited in the receptacle 52a through the flow-out tube 52 and the integrating flowmeter 62a.

The amount of the target liquid thus flowing out through the flow-out tube 52 as the freeze-concentration process progresses, that is, the amount of the volume expansion of the target liquid, is sequentially detected by means of the integrating flowmeter 62a and the signal outputted therefrom is transmitted to the calculation controller 72. On the basis of the signals thus transmitted, the calculation controller 72 calculates the thickness of the ice crystals in the target-liquid flow routes 13a and 14a.

Set values of the flow rate and the growth speed of ice front in the target-liquid flow routes 13a and 14a are preliminarily inputted to the calculation controller 72. On the basis of the aforementioned calculated thickness of the ice crystals, the calculation controller 72 then calculates the inner diameters of the ice crystals in the target-liquid flow routes 13a and 14a and the required flow volume of the target liquid in these target-liquid flow routes 13a and 14a from these calculated inner diameters and the aforementioned set flow rate values in the target-liquid flow routes 13a and 14a and controls the rotary speed of the pump 43 by transmitting signals thereto such that the actually measured flow volume of the target liquid through the target-liquid flow routes 13a and 14a by the flowmeter 62b will become equal to the required flow volume calculated as above, thereby adjusting the quantity of the circulating target liquid. At the same time, the growth speed of the ice front in the target-liquid flow routes 13a and 14a is calculated from the aforementioned calculated thickness of the ice crystals and the temperature of the cooling medium detected by the temperature sensor 62c is adjusted by varying the opening of the three-way valve 62d according to signals outputted from the calculation controller 72 and controlling the flow volume of the cooling medium supplied from the cooling-medium tank 32a to the inlet to the cooling-medium flow route 14b and that discharged from the outlet of the cooling-medium flow route 14b and returned to the inlet of the cooling-medium flow route 14b through the three-way valve 62d and the aforementioned bypass without reaching the cooling-medium tank 32a such that the growth speed will come to agree with a preliminarily set value.

The invention is explained next by way of Test Example and Comparison Example, to be described below. Test Example was one carried out by using centrifugally separated tomato juice as the target liquid, a 75% aqueous solution of a mixture with propylene glycol as its principal component (Tradename: NYBRINE NFP produced by Maruzen Chemical Corporation) as the cooling medium, 2.0 m/sec as the set flow rate of the target liquid in the target-liquid flow route and 4.0 mm/h as the set growth speed of ice front in the target-liquid flow route. Comparison Example was carried out similarly to Test Example as a whole except that the target flow rate of the target liquid in the target-liquid flow route was set to 2.0 m/sec, the target growth speed of ice front in the target-liquid flow route was set to 4.0 mm/h and the frequency of the pump for circulating the target liquid and the temperature of the cooling medium were lowered gradually with time of freeze-concentration as shown in Table 1.

TABLE 1

| Time (Minute) | Pump Frequency (Hz) | Temperature of Cooling Medium (° C.) |
|---|---|---|
| 0 | 62 | −3.0 |
| 10 | 60 | −3.2 |
| 20 | 58 | −3.4 |
| 30 | 56 | −3.6 |
| 40 | 54 | −3.8 |
| 50 | 52 | −4.0 |
| 60 | 50 | −4.2 |
| 70 | 48 | −4.4 |
| 80 | 46 | −4.6 |
| 90 | 44 | −4.8 |
| 100 | 42 | −5.0 |
| 110 | 40 | −5.2 |
| 120 | 38 | −5.4 |
| 130 | 36 | −5.6 |

Figure 3:
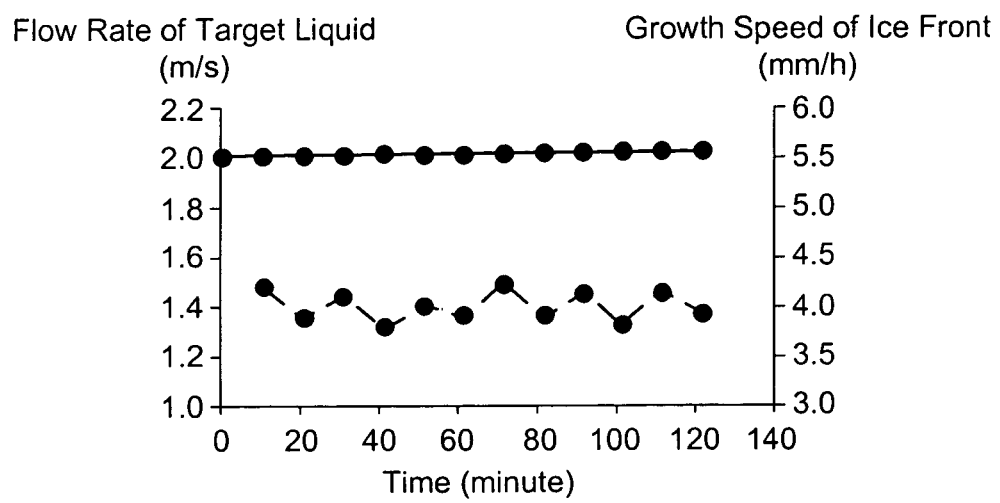
FIG. 3 is a graph for showing the results of a freeze-concentration process controlled by a method according to this invention.
Figure 4:
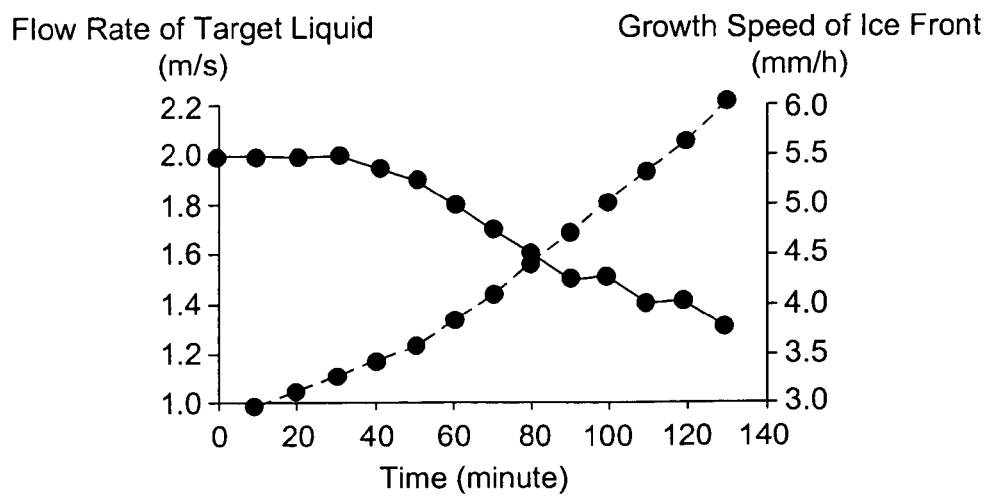
FIG. 4 is a graph for showing the results of a freeze-concentration process controlled by a prior art method.

FIGS. 3 and 4 show the results of freeze-concentration in Test Example and Comparison Example, respectively, both showing the time of freeze-concentration (in minutes) as the horizontal axis, the flow rate (in m/s) of the target liquid on the left-hand side vertical axis and the growth speed (in mm/h) of the ice front on the right-hand side vertical axis. In both FIGS. 3 and 4, the flow rate is shown by a solid line and the growth speed is shown by a broken line.

Table 2 shows the results of freeze-concentration in Test Example and Comparison Example. In Table 2, the partition coefficient is a value defined as $2B/(B_1+B_2)$ where B is the Brix (%) of the ice crystals, $B_1$ is the Brix (%) of the target liquid before the freeze-concentration and $B_2$ is the Brix (%) of the target liquid after the freeze-concentration. The higher the partition coefficient, the greater the content ratio of solute into the ice crystals, and the lower the partition coefficient, the smaller the content ratio of solute into the ice crystals. If the partition coefficient is 1, this means that the freeze-concentration is not progressing at all.

TABLE 2

| | | Test Example | Comparison Example |
|---|---|---|---|
| Time of freeze-concentration (minute) | | 120 | 130 |
| Brix (%) | Before concentration | 5.0 | 5.0 |
| | After concentration | 10.0 | 10.0 |
| | Ice crystals | 0.3 | 1.2 |
| Partition Coefficient | | 0.04 | 0.16 |

FIGS. 3 and 4 and Table 2 clearly show that the flow rate of the target liquid and the growth speed of the ice crystals at the ice-liquid interface can be controlled according to predetermined values according to a method of this invention and hence an efficient freeze-concentration process of a target liquid becomes possible.

What is claimed is:

1. A method of controlling progressive freeze-concentration, said method comprising the steps of:
   circulating a cooling medium through a cooling-medium flow route of a freeze-concentration apparatus while circulating a target liquid for freeze-concentration through a target-liquid flow route of said freeze-concentration apparatus, thereby gradually forming ice crystals on wall surfaces of said target-liquid flow route in freeze-concentration of said target liquid;
   connecting to said target-liquid flow route a volume expansion detecting means for detecting volume expansion of said target liquid;
   obtaining thickness of said ice crystals in said target-liquid flow route from volume expansion detected by said volume expansion detecting means; and
   controlling flow rate of said target liquid and growth speed of ice front in said target-liquid flow route to become equal respectively to a set flow rate value and to a set growth speed value by carrying out Operation A and Operation B based on said obtained thickness;
   wherein said Operation A comprises calculating inner diameter of said ice crystals in said target-liquid flow route from said obtained thickness, calculating a required flow volume of said target liquid in said target-liquid flow route from said calculated inner diameter and said set flow rate, and adjusting circulation volume of said target liquid such that measured flow volume of said target liquid inside said target-liquid flow route becomes equal to said required flow volume; and
   wherein said Operation B comprises calculating actual growth speed of said ice front in said target-liquid flow route from said obtained thickness and adjusting at least one selected from the group consisting of temperature and circulation volume of said cooling medium such that said calculated actual growth speed becomes equal to said set growth speed value.

2. The method of claim 1 wherein said freeze-concentration apparatus comprises cylindrical double tubes each having said target-liquid flow route formed inside and said cooling-medium flow route formed outside.

3. The method of claim 2 wherein said freeze-concentration apparatus comprises two or more cylindrical double tubes, the target-liquid flow routes of said two or more cylindrical double tubes being connected so as to together form a circulating flow route.

4. The method of claim 1 wherein said volume expansion detecting means determines amount of said target liquid spilled out of said target-liquid flow route by detecting one quantity selected from the group consisting of pressure, weight and liquid surface level.

5. The method of claim 1 wherein said volume expansion detecting means determines amount of said target liquid spilled out of said target-liquid flow route by detecting integrated flow volume of said target liquid spilled out of said target-liquid flow route.

6. The method of claim 4 wherein said circulation volume of said target liquid is adjusted in said Operation A by controlling rotary motion of a target-liquid circulating pump by a frequency control.

7. The method of claim 5 wherein said circulation volume of said target liquid is adjusted in said Operation A by controlling rotary motion of a target-liquid circulating pump by a frequency control.

8. The method of claim 6 wherein the temperature of said cooling medium is adjusted in said Operation B by controlling a cooler which is adapted to cool said cooling medium.

9. The method of claim 7 wherein the temperature of said cooling medium is adjusted in said Operation B by controlling a cooler which is adapted to cool said cooling medium.

10. The method of claim 6 wherein the temperature of said cooling medium is adjusted in said Operation B by controlling flow volume of a portion of said cooling medium that is supplied from a cooling-medium tank connected to a cooler to an inlet to said cooling-medium flow route and of another portion of said cooling medium that is discharged from an outlet from said cooling-medium flow route and returned to said inlet to said cooling-medium flow route without passing through said cooling-medium tank.

11. The method of claim 7 wherein the temperature of said cooling medium is adjusted in said Operation B by controlling flow volume of a portion of said cooling medium that is supplied from a cooling-medium tank connected to a cooler to an inlet to said cooling-medium flow route and of another portion of said cooling medium that is discharged from an outlet from said cooling-medium flow route and returned to said inlet to said cooling-medium flow route without passing through said cooling-medium tank.

12. The method of claim 6 wherein the circulation volume of said cooling medium is adjusted in said Operation B by controlling rotary motion of a cooling-medium circulating pump by a frequency control.

13. The method of claim 7 wherein the circulation volume of said cooling medium is adjusted in said Operation B by controlling rotary motion of a cooling-medium circulating pump by a frequency control.

14. The method of claim 8 wherein the circulation volume of said cooling medium is adjusted in said Operation B by controlling rotary motion of a cooling-medium circulating pump by a frequency control.

15. The method of claim 9 wherein the circulation volume of said cooling medium is adjusted in said Operation B by controlling rotary motion of a cooling-medium circulating pump by a frequency control.

16. The method of claim 10 wherein the circulation volume of said cooling medium is adjusted in said Operation B by controlling rotary motion of a cooling-medium circulating pump by a frequency control.

17. The method of claim 11 wherein the circulation volume of said cooling medium is adjusted in said Operation B by controlling rotary motion of a cooling-medium circulating pump by a frequency control.

* * * * *